UNITED STATES PATENT OFFICE.

LUDWIG KALB, OF MUNICH, GERMANY, ASSIGNOR TO BADISCHE ANILIN & SODA FABRIK, OF LUDWIGSHAFEN-ON-THE-RHINE, GERMANY, A CORPORATION.

INDIGO COLORING-MATTER AND DERIVATIVES THEREOF AND PROCESS OF MAKING THEM.

1,012,363.   Specification of Letters Patent.   Patented Dec. 19, 1911.

No Drawing.   Application filed July 24, 1909. Serial No. 509,384.

*To all whom it may concern:*

Be it known that I, LUDWIG KALB, doctor of philosophy and chemist, subject of the King of Bavaria, residing at Munich, Germany, have invented new and useful Improvements in Indigo Coloring-Matters and Derivatives Thereof and Processes of Making Them, of which the following is a specification.

My invention relates to the manufacture, production and use of dehydro derivatives of indigo coloring matters.

It is known that when indigo is oxidized in the presence of water, the molecule is split up and products are produced which cannot be reconverted again into indigo by simple reduction. When the oxidation is carried out in the absence of water, different products are produced. O'Neill (*Chemical News*, 65, page 124) discovered that on treating indigo in a suspension of glacial acetic acid with potassium permanganate, manganese dioxid, or lead dioxid, a grayish green substance was obtained which was closely related to the original indigo and easily reconvertible into it. He called the compound oxyaceto-indigotin, and ascribed to it the formula

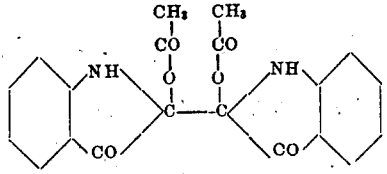

He was unable, however, to obtain the corresponding compound free from the acetyl residue.

I have now discovered that a new oxidation product of indigo can be obtained if the oxidation be carried out in the absence of water and in the presence of an indifferent suspension agent, such as benzene, chloroform, or nitrobenzene. The dark yellowish red solution produced contains an oxidation product of indigo which according to analysis and determination of molecular weight consists of dehydroindigo of the formula

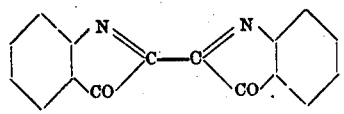

In carrying out this oxidation, I have found silver oxid, lead dioxid, manganese dioxid, and permanganates to be particularly suitable and the oxidation produces better results when a small addition of an anhydrous acid, such for instance as glacial acetic acid, benzoic acid, or hydrogen chlorid, which is soluble in the suspension agent used, is added. The addition of a drying agent, such for instance as calcium chlorid is also of advantage. In contradistinction to indigo, dehydro-indigo is easily soluble in many indifferent solvents. It has a basic character and can be precipitated from its solutions by the addition of anhydrous acids and thus obtained in the form of difficultly soluble salts possessing a yellow-green to grayish green color. The oxyaceto-indigotin obtained by O'Neill is such a salt, and its constitution would probably be more correctly indicated by the formula

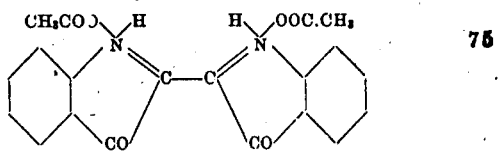

and it should then be termed dehydroindigo acetate. If during the oxidation of indigo in the presence of an indifferent solvent, an excess of acid be used, these salts of dehydroindigo can be directly obtained.

Both dehydroindigo and its salts are unstable in the presence of aqueous alkali and give rise to indigo and di-isatinic acid. I have discovered, however, that salts of dehydroindigo can easily be converted into dehydroindigo itself by suitable treatment in the absense of water. Thus, for instance, dehydroindigo acetate on being heated. preferably in the presence of an indifferent solvent, such for instance as toluene or nitrobenzene, dissociates into dehydroindigo and acetic acid. The production of free dehydro-indigo is promoted if an anhydrous compound which has the power of fixing free acid, such for instance as the hydroxids and carbonates of the alkalis and alkaline earth metals or even tertiary organic bases, be present during the reaction. If desired, the production of a dehydroindigo salt from indigo and the decomposition of this salt into free dehydroindigo can be carried out in one and the same suspension agent without intermediate isolation of the dehydroindigo salt being necessary.

According to German Patent No. 160,817 when chlorin is allowed to act on indigo in the absence of water, chlorinated compounds are obtained which lose their chlorin on treatment with alkalis. I have now discovered that the halogenated derivatives of indigo thus obtained can also be converted into dehydroindigo or halogenated dehydroindigo containing the halogen in the benzene nucleus by treating them with a substance which is capable of fixing halogen hydrid while in the presence of an indifferent solvent and in the absence of water. Suitable halogen hydrid fixing compounds include those acid fixing compounds hereinbefore mentioned and also ammonium carbonate, mercury oxid, and anhydrous sodium acetate. The order in which the materials for preparing dehydroindigo either halogenated or not according to my invention are brought together can be varied, for instance chlorin can be passed into a suspension of indigo in carbon tetrachlorid, and the solution so obtained can be treated with calcium hydroxid, or indigo and calcium hydroxid can be suspended in chloroform and bromin added to the suspension, or pyridin dibromid can be introduced into a suspension of indigo in an indifferent agent. It is known that if pyridin dibromid be allowed to react on indigo in the absence of any diluting agent, brominated indigo containing the bromin in the benzene nucleus is obtained (German Patent No. 149,899).

As a general rule dehydroindigo is not stable in the presence of warm water and is also rapidly converted into indigo in the presence of a reducing agent or a mild oxidizing agent. I have discovered, however, that sulfurous acid or a sulfite or bisulfite when allowed to react on dehydroindigo does not reduce it, but forms an addition product, such for instance as that represented by the formula

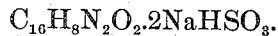
$C_{16}H_8N_2O_2.2NaHSO_3$.

This new compound possesses a yellow color and is easily soluble in water and the solution is stable in the air, even upon being boiled. Other soluble salts of dehydroindigo sulfurous acid, such for instance as the potassium, ammonium, calcium, and barium salts, can be obtained by the addition of the corresponding metallic chlorids to the solution of the sodium salt until the desired compound is salted out, or if desired the said salt can be prepared directly by using the corresponding sulfites or bisulfites. The salts of the organic bases, such for instance as anilin, phenylhydrazin, and benzidin, are very difficultly soluble. The aforesaid new soluble derivatives of dehydroindigo are valuable since they allow a ready method of obtaining a solution of a compound which is nearly related to indigo and readily converted into this latter.

I have above described how indigo itself can be converted into dehydroindigo and derivatives thereof, but I do not limit my invention to the production of dehydroindigo itself, since the corresponding compounds can be obtained from homologues and substitution products of indigo, such for instance as tolyl-indigo and the halogenated indigoes, and hereinafter I wish it to be understood that under the term dehydroindigo bodies I include *inter alia* the dehydroindigo derivatives obtainable from such homologues and substitution products of indigo. I have discovered, however, that halogenated compounds of dehydroindigo can be more readily obtained by the direct halogenation of the compound of dehydroindigo with a sulfite or bisulfite since the halogenation can take place even in the presence of water. Thus for instance if two molecular proportions of bromin be allowed to act upon dehydroindigo sodium bisulfite

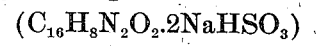
$(C_{16}H_8N_2O_2.2NaHSO_3)$ in the presence of water and the hydrobromic acid formed be subsequently neutralized, a solution is obtained of para-dibrom-dehydroindigo sodium bisulfite

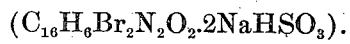
$(C_{16}H_6Br_2N_2O_2.2NaHSO_3)$.

If one or two further molecular proportions of bromin be allowed to react in a similar manner, tri- or tetra-brom-dehydroindigo sodium bisulfite is obtained in solution. In a similar manner chlorinated derivatives of dehydroindigo sodium bisulfite can be obtained, or if different halogens be allowed to react consecutively on the said compounds, mixed halogenated derivatives are obtained. It is not necessary to use halogen in the elementary state in carrying out this process, since halogenization can also be effected by the use of such compounds as hypochlorous acid and hypobromous acid. These bisulfite compounds of dehydroindigo and its derivatives can be converted into the corresponding indigoes by treatment with acid or alkaline reagents.

The sulfite, or bisulfite, derivatives of dehydroindigo or of homologues or of halogenated derivatives thereof are very suitable for the production of indigo vats, since although they require more hydrogen to reduce them to indigo white, reduction takes place much more easily on account of the fact that the said sulfite derivatives are easily soluble in water and consequently more readily attacked by the reducing agent used. The reduction takes place almost instantaneously and even while cold. A hydrosulfite vat can for instance be prepared by pouring the solution of the dehydroindigo compound into a solution containing the necessary quantity of hydrosulfite and caustic alkali. Besides being useful in the preparation of indigo vats the said dehydro-indigo sulfite compounds can be used for producing indigo coloring effects on textile fiber and paper. For instance, by introducing textile fiber or paper into a solution of the dehydroindigo sulfite compound, or printing the said solution on to the fiber or paper, then drying and subsequently passing the material so treated through dilute mineral acid or an alkaline solution containing, for instance, caustic alkali, milk of lime, or alkali carbonate, the development of the indigo coloring matter takes place instantaneously. If an alkali developing agent be employed the goods should be acidified before being washed. As a developing agent, five per cent. hydrochloric acid, or from one, to five, per cent. caustic soda solution, or five, to ten, per cent. sodium carbonate solution, can be employed, and if a very dilute developing agent be used a neutral salt, such as sodium chlorid, should preferably be added to it. The addition of a reducing agent, such for instance as glucose, to the printing paste often assists in the development of the coloring matter, as does also the addition of a compound such as dicarbonate or magnesia which exercises an alkaline action on being heated.

I have found that the soluble dehydroindigo sulfite compounds, especially when in a moist state, are sensitive to light, giving rise to the corresponding indigo coloring matter. This property is possessed in a particularly high degree by tetrachlor and tetrabrom dehydro-indigo sulfite compounds. This property can be made use of in the production of light effects on textile fiber and paper. For instance an aqueous solution of the said dehydro indigo sulfite compound is brought on to the material which is then dried in the dark, or at any rate in the absence of sufficient light to cause any harmful effect. The material, which then possesses a yellow appearance, can be placed behind a photographic negative and exposed to a strong source of light, such as the sun, whereupon the corresponding positive is produced on the material, since at those points where the sunlight passes through the negative and reaches the material the corresponding indigo coloring matter is formed. The material is subsequently washed, whereupon unaltered dehydroindigo sulfite compound is washed away. The effects thus produced are stable against washing.

The following examples will serve to illustrate further the nature of my invention, which, however, is not confined to these examples. The parts are by weight.

Example 1: Boil together gently ten parts of indigo, fifty parts of lead dioxid, ten parts of anhydrous powdered calcium chlorid, and nine hundred parts of benzene, and while stirring add five parts of glacial acetic acid during a period of ten minutes. Stir for another five minutes and then filter off the yellowish red solution and evaporate it at reduced pressure till dehydroindigo commences to crystallize out. Then cool, filter off the crystals and wash them with ether. They are very difficultly soluble in ether, somewhat soluble in hot benzene, fairly easily soluble in chloroform, and easily soluble in hot nitrobenzene and naphthalene. Dehydro-indigo is stable in the air. On treatment with alkaline reducing agents and also with, for instance, phenol, anilin, phenylhydrazin, or hydroquinone, it is converted into indigo. Aqueous solutions of acids and alkalis and also warm water and alcohol decompose it, some indigo being formed. In concentrated sulfuric acid it yields at first a pure blue solution which rapidly turns dull green; on heating, however, the solution turns blue again. In a similar manner ortho-tolyl-dehydro-indigo can be obtained. In this example and also in the following examples, the quantity of lead dioxid depends upon the quality of this substance used, as it is generally not met with in a pure state, and upon the purity and quantity of the compound employed there also depends the quantity of glacial acetic acid to be used.

Example 2: Shake together ten parts of indigo, thirty parts of lead dioxid, ten parts of glacial acetic acid, and two hundred parts of benzene, for a few hours until all the indigo is converted into small, almost colorless prisms of dehydroindigo acetate. Then add eight hundred parts of benzene and fifty parts of dried powdered sodium carbonate, and boil, while stirring, for from thirty, to sixty, minutes, replacing the moist benzene which distils off by fresh portions of dry benzene. A yellowish red solution of dehydro-indigo is obtained and this can be filtered off and worked up as described in the foregoing Example 1.

Example 3: Heat together for a short time ten parts of dehydroindigo acetate, fifty parts of benzene and twenty-five parts of pyridin, until all the acetate has disappeared. At the same time dehydroindigo separates out in the form of a heavy crystalline powder and can be filtered off and washed with ether.

Example 4: Introduce one part of dibrom-dehydroindigo acetate, obtainable by oxidizing 5.5'-dibrom-indigo with potassium permanganate in the presence of warm glacial acetic acid according to the method of O'Neill (*Chemical News*, 65, p. 124), into twelve parts of nitrobenzene, at a temperature of from one hundred and five, to one hundred and ten degrees centigrade. It immediately goes into solution and then the difficultly soluble dibrom-dehydroindigo crystallizes out and should be filtered off while warm. It can be re-crystallized from chlorbenzene and possesses a reddish yellow color. It is insoluble in ether, very difficultly soluble in benzene and chloroform, and fairly difficultly soluble in hot nitrobenzene and naphthalene. It differs from the unsubstituted compound in being stable in the presence of hot water. Its solution in concentrated sulfuric acid is at first violet, but it turns rapidly greenish blue.

Example 5: Stir together ten parts of indigo, forty parts of dry finely powdered calcium hydroxid, and six hundred parts of chloroform, and introduce during ten minutes thirteen parts of bromin. Continue stirring for a short time till all the indigo has disappeared, filter and evaporate the yellowish red solution under reduced pressure until a dark red crystalline mass is obtained. Filter this off and wash with ether. It contains some halogen in the benzene ring, but otherwise has properties corresponding to those of the compound obtained according to the foregoing Example 1.

Example 6: Shake together, for twelve hours, fifty parts of powdered dehydro-indigo and one thousand parts of sodium bisulfite solution of thirty-eight, to forty, degrees Baumé, and then filter off the product and wash it with a solution of common salt. It can be purified by dissolving it in a small quantity of water, filtering and either adding common salt to the solution or by evaporating it at about sixty degrees centigrade under reduced pressure until crystallization takes place. The compound is easily soluble in water and insoluble in alcohol and the ordinary organic solvents. It gives a yellowish green solution in concentrated sulfuric acid. On being heated with hydrochloric acid, indigo and isatin are obtained. On being treated with a reducing agent, such for instance as stannous chlorid, or potassium iodid and hydrochloric acid, indigo is obtained, as is also the case when it is treated with caustic soda. Upon treatment with excess of alkaline hydrosulfite a solution of indigo white is obtained.

Example 7: Mix together fifty parts of dehydroindigo acetate and a solution of eighty parts of crystalline sodium sulfite in seven hundred and fifty parts of water, add two hundred parts of alcohol, and boil the whole, while stirring. Filter the solution, cool the filtrate and precipitate by means of common salt. In a similar manner the corresponding compounds can be obtained from orthotolyl-dehydroindigo acetate and from dibrom-dehydroindigo-acetate, although in this latter case there is a greater tendency to the formation of some dibrom-indigo as well as dibrom-dehydroindigo sodium bisulfite. This latter compound possesses a canary yellow color and yields a green solution in concentrated sulfuric acid.

In the above example, instead of acting on pure dehydroindigo acetate with normal sulfite, the same result is obtained if sodium bisulfite be allowed to react on the crude acetate obtained according to the first part of the foregoing example 2 by shaking together indigo, lead dioxid, glacial acetic acid, and benzene, and then filtering off the product.

Example 8: Dissolve twelve and three-fifths parts of dehydroindigo sodium bisulfite (containing two molecular proportions of water of crystallization) in two hundred parts of warm water. Cool the solution to about five degrees centigrade and add, while stirring, eight parts of bromin. As soon as a test portion shows that no further bromin is present, add four and one-fifths parts of sodium bicarbonate and precipitate the para-dibrom-dehydroindigo sodium bisulfite by means of common salt.

Example 9: Dissolve twelve and three-fifths parts of dehydroindigo sodium bisulfite (containing two molecular proportions of water of crystallization) in one hundred and twenty parts of water, and add, while stirring and cooling with ice, sixteen parts of bromin. When this latter has all gone into solution, stir for another twenty-minutes and then neutralize with eight and a half parts of sodium bicarbonate, whereupon tetrabrom-dehydroindigo sodium bisulfite commences to crystallize out and the separation can be completed by the addition of common salt. The new compound possesses a yellowish color and contains water of crystallization. It is easily soluble in water, but insoluble in alcohol and other organic solvents. It yields a blue solution in concentrated sulfuric acid. Upon being heated with dilute hydrochloric acid it yields tetrabrom-indigo, sulfuric acid, and sulfurous acid, thus differing from the non-halogenized dehydro-indigo sulfite compounds. It also differs from the said non-halogenated compounds in that on treatment with cold one per cent. caustic soda solution it yields a yellowish green precipitate which only on being boiled is converted into tetrabrom-indigo. In a corresponding manner tetrachlor-dehydroindigo sodium bisulfite can be obtained.

Now what I claim is:—

1. The process of producing halogenated indigo coloring matter by oxidizing an indigo coloring matter in the absence of water and in the presence of an indifferent suspension agent, until a dehydro derivative of the indigo coloring matter is formed, then converting this dehydro derivative into its sulfurous acid salt by treatment with a sulfurous acid compound, then acting on the dehydro indigo coloring matter sulfurous acid salt with a halogenating agent and finally reducing the halogenated dehydro indigo coloring matter compound which has been produced.

2. In the production of halogenated indigo coloring matter, the step which consists in producing dehydro derivatives of indigo coloring matters by oxidizing an indigo coloring matter in the absence of water and in the presence of an indifferent suspension agent.

3. In the production of halogenated indigo coloring matter, the step which consists in producing dehydro derivatives of indigo coloring matters by oxidizing an indigo coloring matter in the absence of water and in the presence of an indifferent suspension agent and of a small quantity of an anhydrous acid.

4. In the production of halogenated indigo coloring matter, the step which consists in producing a dehydro indigo coloring matter salt containing the sulfurous acid radical by acting on a dehydro indigo coloring matter body with a sulfurous acid compound.

5. In the production of halogenated indigo coloring matter, the step which consists in producing a dehydro indigo coloring matter salt containing the sulfurous acid radical by acting on a salt of a dehydro indigo coloring matter with a sulfurous acid compound.

6. In the production of halogenated indigo coloring matter, the step which consists in producing the sodium bisulfite compound of dehydroindigo by acting on dehydroindigo acetate with sodium bisulfite.

7. In the production of halogenated indigo coloring matter, the step which consists in producing a halogenated derivative of a sulfurous acid salt of a dehydroindigo coloring matter by treating a sulfurous acid salt of a dehydroindigo compound with a halogenating agent.

8. In the production of halogenated indigo coloring matter, the step which consists in producing a sulfurous acid salt of tetrabromdehydroindigo by treating a sulfurous acid salt of dehydroindigo with at least four molecular proportions of bromin.

9. In the production of halogenated indigo coloring matter, the step which consists in producing a sulfurous acid salt of tetrabromdehydroindigo by treating a sulfurous acid salt of dehydroindigo with at least four molecular proportions of bromin in the presence of water.

10. In the production of halogenated indigo coloring matter, the step which consists in producing leuco compounds of halogenated indigo coloring matters by reducing a dehydro derivative of a halogenated indigo coloring matter.

11. In the production of halogenated indigo coloring matter, the step which consists in producing leuco compounds of halogenated indigo coloring matters by reducing a sulfurous acid salt of a halogenated dehydroindigo coloring matter.

12. In the production of halogenated indigo coloring matter, the step which consists in reducing a sulfurous acid salt of a dehydro derivative of a halogenated indigo coloring matter till the leuco coloring matter is formed and then oxidizing this back to the halogenated indigo coloring matter.

13. In the production of halogenated indigo coloring matter, the step which consists in reducing a sulfurous acid salt of a dehydro derivative of a halogenated indigo coloring matter.

14. In the production of halogenated indigo coloring matter, the step which consists in reducing a sulfurous acid salt of a dehydro derivative of tetrabrom indigo.

15. In the production of halogenated indigo coloring matter, the step which consists in reducing by exposing to the action of light a sulfurous acid salt of a dehydro derivative of a halogenated indigo coloring matter.

16. As new articles of manufacture compounds of dehydro derivatives of halogenated indigo coloring matters, which compounds contain the sulfurous acid radicle and are stable in the presence of water, and which upon reduction with alkaline hydrosulfite yield leuco compounds of halogenated indigo coloring matters.

17. As a new article of manufacture the sodium bisulfite compound of tetrabrom-dehydroindigo which possesses a constitution corresponding to the formula $$C_{16}H_4Br_4N_2O_2.2NaHSO_3,$$

which possesses a yellow color, is easily soluble in water yielding a stable solution, and which upon reduction with alkaline hydrosulfite gives rise to tetrabromindigo white.

In testimony whereof I have hereunto set my hand in the presence of two subscribing witnesses.

LUDWIG KALB.

Witnesses:
 RUDOLF PUMMERER,
 R. FRANK.